US012637057B2

(12) United States Patent (10) Patent No.: US 12,637,057 B2
Cancel et al. (45) Date of Patent: May 26, 2026

(54) HYBRID VEHICLE STATE OF CHARGE CONTROL

(71) Applicant: JAGUAR LAND ROVER LIMITED, Whitley (GB)

(72) Inventors: Laurentiu Cancel, Southam (GB); Matthew Hancock, Rugby (GB); Csaba Molnar, Warwick (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 324 days.

(21) Appl. No.: 17/920,759

(22) PCT Filed: Apr. 21, 2021

(86) PCT No.: PCT/EP2021/060388
§ 371 (c)(1),
(2) Date: Oct. 21, 2022

(87) PCT Pub. No.: WO2021/214138
PCT Pub. Date: Oct. 28, 2021

(65) Prior Publication Data
US 2023/0150474 A1 May 18, 2023

(30) Foreign Application Priority Data

Apr. 21, 2020 (GB) ...................................... 2005817

(51) Int. Cl.
*B60W 20/12* (2016.01)
*B60W 10/06* (2006.01)
*B60W 20/13* (2016.01)

(52) U.S. Cl.
CPC ............ *B60W 20/12* (2016.01); *B60W 10/06* (2013.01); *B60W 20/13* (2016.01);
(Continued)

(58) Field of Classification Search
None
See application file for complete search history.

(56) References Cited

U.S. PATENT DOCUMENTS 6,314,347 B1 11/2001 Kuroda et al.
2012/0035795 A1* 2/2012 Yu .......................... B60W 20/12
180/65.265
(Continued)

FOREIGN PATENT DOCUMENTS

JP 2000333305 A 11/2000
JP 2002359904 A * 12/2002
(Continued)

OTHER PUBLICATIONS

English translation of Japanese Office Action corresponding to application 2022-564024, dated Nov. 28, 2023, 2 pages.
(Continued)

*Primary Examiner* — Brian P Sweeney
*Assistant Examiner* — David Hatch
(74) *Attorney, Agent, or Firm* — TROUTMAN PEPPER LOCKE LLP; Dustin B. Weeks; Nicholas H. Doss

(57) ABSTRACT

Aspects of the present invention relate to a control system and method for controlling a state of charge of energy storage means of a hybrid electric vehicle, the control system comprising one or more electronic controllers, the one or more electronic controllers configured to:
receive destination data;
determine a route to be travelled by the vehicle, the route comprising one or more characteristics, in dependence on the received destination data; and
control the state of charge of the energy storage means in dependence on the route to allow the vehicle to travel an end portion of the route in an electric-only mode.

14 Claims, 4 Drawing Sheets

(52) U.S. Cl.
CPC ..... *B60W 2520/10* (2013.01); *B60W 2530/18* (2013.01); *B60W 2540/215* (2020.02); *B60W 2552/15* (2020.02); *B60W 2554/40* (2020.02); *B60W 2710/0666* (2013.01); *B60W 2710/244* (2013.01)

(56) References Cited

U.S. PATENT DOCUMENTS

| | | | |
|---|---|---|---|
| 2013/0030635 A1 | 1/2013 | Morita | |
| 2015/0039169 A1* | 2/2015 | Dextreit | B60W 50/082 |
| | | | 180/65.265 |
| 2016/0264124 A1* | 9/2016 | Hotta | B60W 10/06 |
| 2016/0325727 A1 | 11/2016 | Ogawa | |
| 2019/0291712 A1* | 9/2019 | Symanow | B60L 50/16 |
| 2019/0322270 A1 | 10/2019 | Kurihashi et al. | |

FOREIGN PATENT DOCUMENTS

| | | |
|---|---|---|
| JP | 2009248822 A | 10/2009 |
| JP | 2012111369 A | 6/2012 |
| JP | 2016165918 A | 9/2016 |
| WO | 2010140305 A1 | 12/2010 |

OTHER PUBLICATIONS

Patents Act 1977: Combined Search and Examination Report under Sections 17 and 18(3) corresponding to Great Britain Application No. GB2005817.8, dated Aug. 14, 2020, 7 pages.
International Search Report corresponding to International Application No. PCT/EP2021/060388, dated Jun. 23, 2021, 5 pages.
Written Opinion corresponding to International Application No. PCT/EP2021/060388, dated Jun. 23, 2021, 7 pages.
European Office Action corresponding to application 21 721 448.5, dated Oct. 2, 2024, 7 pages.

\* cited by examiner 10, 16
12
14
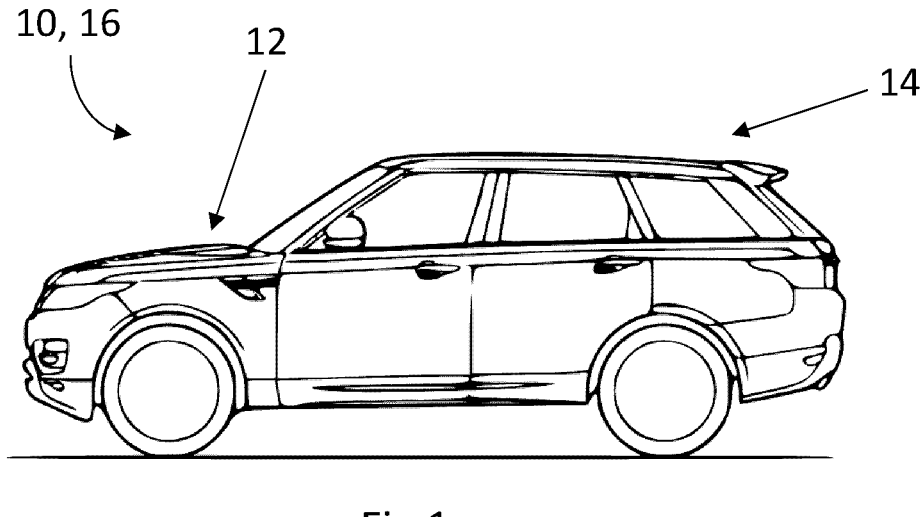
Fig 1
12
24
28
30
18
Fig 2A
40
30
Fig 2B
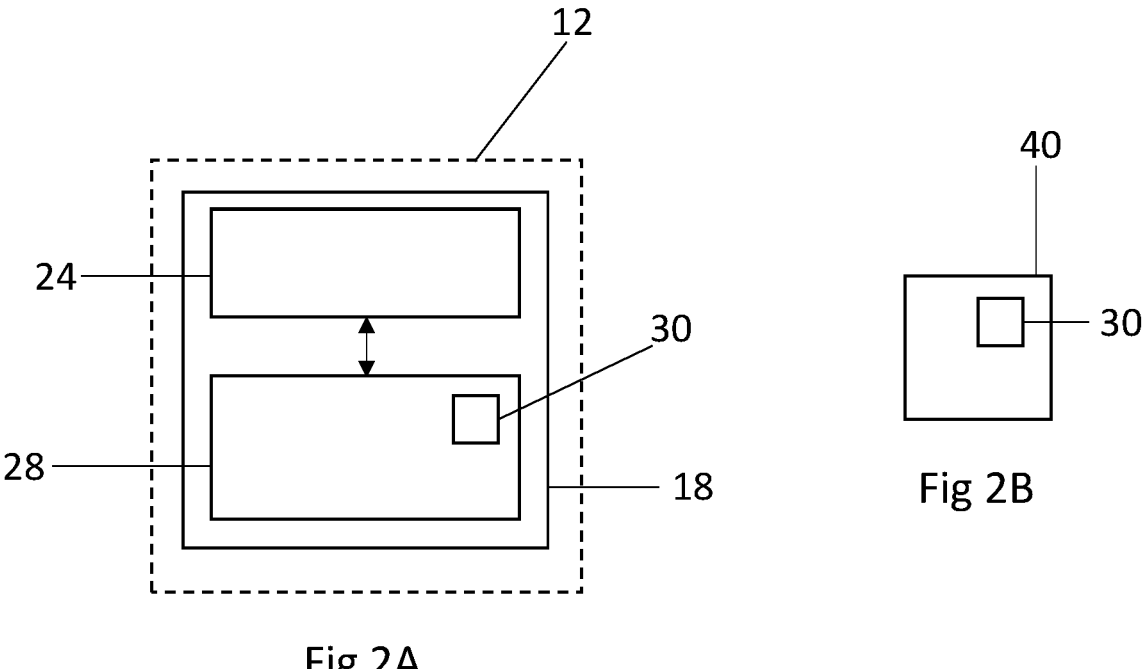

HYBRID VEHICLE STATE OF CHARGE CONTROL

TECHNICAL FIELD

The present disclosure relates to a hybrid vehicle control system and methods. In particular, but not exclusively, it relates to a hybrid vehicle control system and methods to control state of charge of an energy storage means.

BACKGROUND

A plug-in hybrid electric vehicle (PHEV) is capable of driving in electric-only mode, depending on the state of charge of an energy storage means of the vehicle, such as a high voltage battery or batteries. When the energy storage means, such as the high voltage battery of the vehicle, is depleted and the vehicle is in charge sustain mode, the vehicle is not capable of driving in electric-only mode. This can often mean that the end portion of a journey cannot be driven in electric-only mode as by the end of the journey the energy storage means of the vehicle can often become depleted. This results in the plug-in hybrid electric vehicle driving the end portion of the journey using an internal combustion engine which results in air and noise pollution around built-up areas, which are often present at the end of a route/journey.

SUMMARY OF THE INVENTION

It is an aim of the present invention to address one or more of the disadvantages associated with the prior art, to improve, for example, noise and air pollution caused at the end of journeys/routes.

Aspects and embodiments of the invention provide a control system, a vehicle system, a vehicle, a method, and computer software, as claimed in the appended claims.

According to an aspect of the invention there is provided a control system for controlling a state of charge of energy storage means of a hybrid electric vehicle, the control system comprising one or more electronic controllers, the one or more electronic controllers configured to: receive destination data; determine a route to be travelled by the vehicle, the route comprising one or more characteristics, in dependence on the received destination data; and control the state of charge of the energy storage means in dependence on the route to allow the vehicle to travel an end portion of the route in an electric-only mode.

An advantage providing a reduction in air and/or noise pollution at the end portion of the route for which is typically in built-up, populous areas The one or more controllers may collectively comprise: at least one electronic processor having an electrical input for receiving destination data and information associated with determining a route to be travelled by the vehicle; and at least one electronic memory device electrically coupled to the at least one electronic processor and having instructions stored therein; and wherein the at least one electronic processor is configured to access the at least one electronic memory device and execute the instructions thereon so as to cause the control system to determine a route to be travelled by the vehicle and to control the state of charge of the energy storage means.

The one or more characteristics of the route may comprise at least one of: a length of route; an expected speed profile; a gradient profile; an expected traffic flow profile; and availability of a vehicle charger at the end of the route.

The destination data may be received from at least one input by a user of the vehicle.

Controlling the state of charge of the energy storage means may comprise selecting an energy management mode for at least a portion of the route. The energy management mode may be a charging mode or a harvesting mode. The charging mode may comprise controlling an engine of the vehicle to provide torque to allow electrical energy generation. The one or more electronic controllers may be configured to: segment the route into a plurality of segments in dependence on the one or more characteristics of the route; and assign an energy management mode to one or more of the plurality of segments.

Controlling the state of charge of the energy storage means may comprise controlling: an electrical energy usage of the vehicle; an electrical energy storage of the vehicle; and/or an electrical energy generation of the vehicle.

The end portion of the route may be substantially the final 1 to 2 kilometres of the route, optionally the final 1.5 km.

Controlling the electrical energy storage of the vehicle may comprise allowing the state of charge of the energy storage means of the vehicle to fall below a charge sustain threshold of the vehicle to allow the vehicle to travel the end portion of the route in electric-only mode.

Controlling electrical energy storage of the vehicle may comprise allowing the state of charge of the energy storage means of the vehicle to fall below a charge sustain threshold in dependence on the availability of at least one vehicle charger at the end of the route.

According to an aspect of the invention there is provided a vehicle system comprising the control system and one or more components of a hybrid electric vehicle powertrain.

According to an aspect of the invention there is provided a vehicle comprising the control system or the vehicle system.

According to an aspect of the invention there is provided a method for controlling a state of charge of energy storage means of a hybrid electric vehicle, the method comprising: receiving destination data; determining a route to be travelled by the vehicle, the route comprising one or more characteristics, in dependence on the received destination data; and controlling the state of charge of the energy storage means in dependence on the route to allow the vehicle to travel an end portion of the route in an electric only mode.

The one or more characteristics of the route may comprise at least one of: a length of route; an expected speed profile; a gradient profile; an expected traffic flow profile; and availability of a charger at the end of the route.

The destination data is received from at least one input by a user of the vehicle.

Controlling the state of charge of the energy storage means may comprise selecting an energy management mode for at least a portion of the route. The energy management mode may be a charging mode or a harvesting mode. The charging mode may comprise controlling an engine of the vehicle to provide torque to allow electrical energy generation.

The method may comprise: segmenting the route into a plurality of segments in dependence on the one or more characteristics of the route; and assigning an energy management mode to one or more of the plurality of segments Controlling the state of charge of the energy storage means may comprise controlling: an electrical energy usage of the vehicle; an electrical energy storage of the vehicle; and/or an electrical energy generation of the vehicle.

Controlling the electrical energy storage of the vehicle may comprise allowing the state of charge of the energy storage means of the vehicle to fall below a charge sustain threshold of the vehicle to allow the vehicle to travel the end portion of the route in electric-only mode.

Controlling electrical energy storage of the vehicle may comprise allowing the state of charge of the energy storage means of the vehicle to fall below a charge sustain threshold in dependence on the availability of at least one vehicle charger at the end of the route.

According to an aspect of the invention there is provided a non-transitory computer readable medium comprising computer readable instructions that, when executed by a processor, perform any one or more of the methods described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a vehicle;

FIG. 2A schematically illustrates an example of a control system;

FIG. 2B schematically illustrates an example of a non-transitory computer-readable medium;

DETAILED DESCRIPTION

Figure 3:
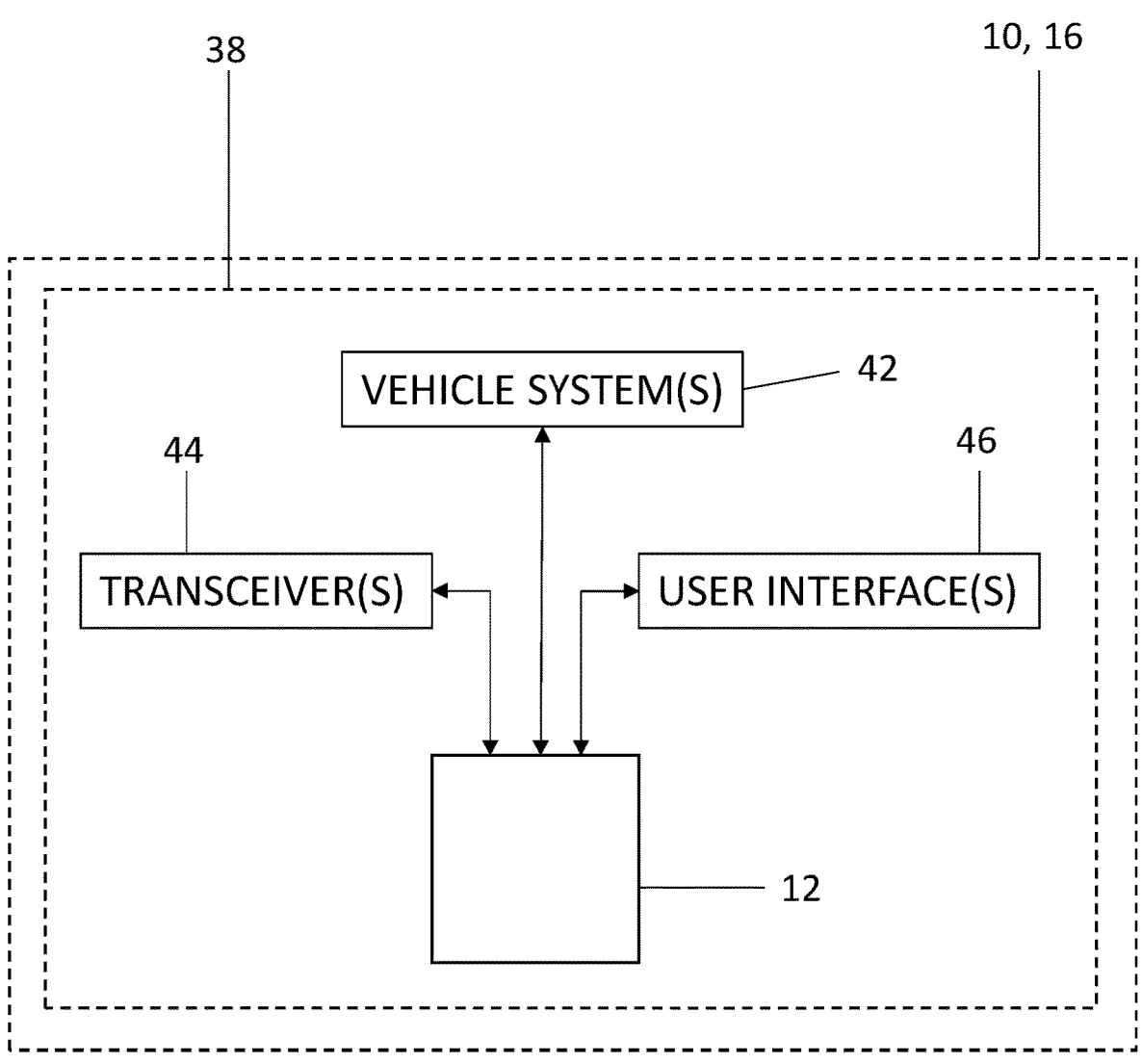
FIG. 3 schematically illustrates an example of a vehicle system.

Examples of the present disclosure relate to controlling state of charge of an energy storage means of a hybrid electric vehicle. In examples, the energy storage means can be any suitable energy storage means to power one or more electric traction motors of the hybrid electric vehicle to propel the vehicle.

In examples, the energy storage means can be considered: one or more components configured to store energy, energy storage circuitry, energy storage apparatus, energy storage mechanisms and so on. In examples, the energy storage means comprises or is one or more traction batteries which may be one or more high voltage batteries.

In examples, the state of charge of the energy storage means is controlled in dependence on the route to allow the vehicle to travel an end portion of the route in an electric-only mode. In examples, the end portion of the route is substantially the final 1-2 km of the route, optionally the final 1.5 km. In examples, the end portion of the route is substantially the last mile or 1.62 km of the route.

Controlling a state of charge of the energy storage means to allow the vehicle to travel an end portion of the route in electric-only mode is advantageous as, for example, it providing a reduction in air and/or noise pollution at the end portion of the route for which is typically in built-up, populous areas. Furthermore, this can improve the electric only mode perception of the vehicle.

One or more of the features discussed in relation to FIGS. 1, 2A, 2B and 3 can be found in the other figures.

FIG. 1 illustrates an example of a vehicle 10 in which embodiments of the invention can be implemented. In the illustrated example, the vehicle 10 is a hybrid electric vehicle 16 (HEV). In some, but not necessarily all, examples, the vehicle 10 is a passenger vehicle, also referred to as a passenger car or as an automobile. In other examples, embodiments of the invention can be implemented for other applications, such as industrial vehicles.

In examples the hybrid electric vehicle 16 has an electric-only mode of propulsion among other modes of propulsion. In examples, the HEV is configured to operate as a parallel HEV. Parallel HEVs comprise a torque path between the engine and at least one vehicle wheel, as well as a torque path between an electric traction motor and at least one vehicle wheel. The torque path(s) may be disconnectable by a torque path connector such as a clutch. Parallel HEVs differ from series HEVs, because in series HEVs the purpose of the engine is generate electrical energy and there is no torque path between the engine and vehicle wheels.

FIG. 2A illustrates an example of a control system 12. In the illustrated example, the control system 12 is a control system 12 for controlling a state of charge of energy storage means 14 of a hybrid electric vehicle 16.

In examples, any suitable control system 12 for controlling a state of charge of energy storage means 14 of a hybrid electric vehicle 16 can be used.

The control system 12 of FIG. 2A comprises an electronic controller 18. In other examples, the control system 12 comprises a plurality of electronic controllers 18 on board and/or off board the vehicle 10, 16.

The electronic controller 18 of FIG. 2A comprises at least one electronic processor 24 and at least one electronic memory device 28 electrically coupled to the at least one electronic processor 24 and having instructions 30 (for example a computer program) stored therein, the at least one electronic memory device 28 and the instructions 30 configured to, with the at least one electronic processor 24, cause any one or more of the method or methods described herein to be performed.

Accordingly, FIG. 2A illustrates a control system 12 for controlling a state of charge of energy storage means 14 of a hybrid electric vehicle 16, the control system 12 comprising one or more electronic controllers 18, the one or more electronic controllers 18 configured to:

receive destination data;

determine a route 20 to be travelled by the vehicle 16, the route 20 comprising one or more characteristics, in dependence on the received destination data; and control the state of charge of the energy storage means 14 in dependence on the route 20 to allow the vehicle 16 to travel an end portion 22 of the route 20 in an electric-only mode.

In examples, the end portion of the route is substantially the final 1-2 km of the route, optionally the final 1.5 km. In examples, the end portion of the route is substantially the last mile or 1.62 km of the route.

Furthermore, FIG. 2A therefore illustrates a control system 12, wherein the one or more controllers 18 collectively comprise:

at least one electronic processor 24 having an electrical input for receiving destination data and information associated with determining a route 20 to be travelled by the vehicle 16; and at least one electronic memory device 28 electrically coupled to the at least one electronic processor 24 and having instructions 30 stored therein;

and wherein the at least one electronic processor 24 is configured to access the at least one electronic memory device 28 and execute the instructions 30 thereon so as to cause the control system 12 to determine a route 20 to be travelled by the vehicle 16 and to control the state of charge of the energy storage means 14.

FIG. 2B illustrates a non-transitory computer-readable storage medium 40 comprising the instructions 30 (computer software). Accordingly, FIG. 2B illustrates a non-transitory computer-readable medium 40 comprising computer-readable instructions 30 that, when executed by a processor 24, perform the method of FIG. 4 and/or as described herein.

FIG. 3 illustrates an example of a vehicle system 38. In the illustrated example, the vehicle system 38 is a system for controlling a state of charge of energy storage means 14 of a hybrid electric vehicle 16.

FIG. 3 also illustrates an example of a vehicle 10, such as a hybrid electric vehicle 16, comprising a control system 12 as described herein and/or a vehicle system 38 as described herein.

In the example of FIG. 3, the vehicle system 38 comprises a control system 12 which may be as described in relation to FIG. 2A. In the example of FIG. 3, the vehicle system 38 comprises one or more vehicle systems 42, which may be considered further vehicle system(s) 42, one or more transceivers 44 and one or more user interfaces 46.

In the example of FIG. 3, the control system 12 provides means for controlling operation of the vehicle system 38. However, in examples, any suitable means for controlling operation of the vehicle system 38 may be used.

The control system 12 of FIG. 3 may comprise one or more of: a hybrid powertrain control module; an engine control unit; a transmission control unit; a traction battery management system; and/or the like.

As illustrated in the example of FIG. 3, the elements 42, 44 and 46 are operationally coupled to the control system 12 and any number or combination of intervening elements can exist between them (including no intervening elements). In some examples, at least some of the elements 42, 44 and 46 are operationally coupled to each other and/or share one or more components. Additionally, or alternatively, the elements 42, 44 and 46 may be operationally coupled to and/or share one or more components with other elements not illustrated in the example of FIG. 3.

In examples, the one or more vehicle systems 42 are any suitable vehicle system(s) 42 of the vehicle 10, 16. For example, the one or more vehicle systems 42 may comprise any suitable vehicle system(s) 42 of the vehicle 10, 16 controllable, at least in part, by the control system 12. In examples, the one or more vehicle systems 42 comprise one or more vehicle systems 42 used in controlling a state of charge of energy storage means 14 of a hybrid electric vehicle 16.

The vehicle system(s) 42 may be considered further vehicle system(s) 42 comprised in a vehicle system 38. In examples, the one or more vehicle systems 42 comprise one or more vehicle components involved in electrical energy usage of the vehicle 10 and/or one or more vehicle components involved in electrical energy storage of a vehicle 10 and/or one or more vehicle components involved in electrical energy generation of the vehicle 10.

In some examples, the one or more vehicle systems 42 comprise one or more components of a hybrid electric vehicle powertrain. Accordingly, in examples, there is provided a vehicle system 38 comprising a control system 12 as described herein and one or more components of a hybrid electric vehicle powertrain.

In examples a hybrid electric vehicle powertrain comprises at least one engine. The engine may be a combustion engine. In some examples the engine is an internal combustion engine.

The control system 12 is, in examples, operably coupled to the engine to enable the control system to control output torque of the engine. The output torque of the engine may be controlled by controlling one or more of: air-fuel ratio; spark timing; poppet valve lift; poppet valve timing; throttle opening position; fuel pressure; turbocharger boost pressure; and/or the like, depending on the type of engine.

In examples a hybrid electric vehicle powertrain comprises at least one electric traction motor. The at least one electric traction motor may be an alternating current induction motor or a permanent magnet motor, another type of motor or any suitable combination of such motors.

The control system 12 is, in examples, operably coupled to the at least one electric traction motor to enable the control system to control output torque of the electric traction motor(s). In examples at least one of the at least one electric traction motor is configured to provide torque to allow the vehicle 10, 16 to travel in an electric-only mode.

In examples, the one or more vehicle systems 42 comprise the energy storage means 14 of the vehicle 10. In some examples, the energy storage means 14 can be part of a hybrid electric vehicle powertrain.

In examples, the energy storage means 14 comprise one or more traction batteries, which may be high voltage batteries, configured to store electrical energy for the electric traction motor(s).

In examples the one or more traction batteries provide a nominal voltage required by electrical power users such as electric traction motors. If the electric traction motors run at different voltages, DC-DC converters or the like may be provided to convert voltages. In examples where an AC motor is used an inverter can be used to provide power from a DC source.

In some examples the one or more traction batteries is a high voltage battery. High voltage traction batteries provide nominal voltages in the hundreds of volts, as opposed to traction batteries for mild HEVs which provide nominal voltages in the tens of volts. The one or more traction batteries may have a voltage and capacity to support electric-only driving for sustained distances. The one or more traction batteries may have a capacity of several kilowatt-hours, to maximise range. The capacity may be in the tens of kilowatt-hours, or even over a hundred kilowatt-hours.

In examples, the one or more vehicle systems 42 comprise one or more energy regeneration systems of the vehicle 10.

In examples, the one or more energy regeneration systems of the vehicle 10 can comprise any suitable system for generating energy, such as electrical energy, while the vehicle 10 travels to a desired destination. In examples, the one or more energy regeneration systems comprises one or more regenerative braking systems, one or more solar regenerative systems and so on. Other energy regeneration systems are useful, such as any regenerative system configured to convert kinetic energy of the vehicle into electrical energy which can be used to charge energy storage means 14.

In examples, the one or more electric traction motors can form at least part of an energy regeneration system(s) of the vehicle systems 42.

In examples, the control system 12 provides means for controlling operation of the one or more vehicle systems 42. Information may be transmitted between the control system 12 and the one or more vehicle systems 42. For example, control information may be transmitted from the control system 12 to the one or more vehicle systems 42 and/or information from the one or more vehicle systems 42, such as information regarding energy storage levels of the vehicle 10, transmitted to the control system 12.

This is illustrated in the example of FIG. 3 by the double-headed arrow linking the one or more vehicle systems 42 and the control system 12.

The one or more user interfaces 46 comprise any suitable user interface(s) for or configured to receive user input from a user, such as one or more occupants of a vehicle 10. For example, any suitable user interface(s) 46 for receiving at least one input by a user of the vehicle to provide destination data and/or route information and/or location information of the vehicle 10, 16.

That is, in some examples, the one or more user interfaces 46 provide means for a user, such as an occupant or user of the vehicle 10, to input destination data.

In examples, the one or more user interfaces 46 comprise one or more displays, one or more keyboards, one or more touch sensitive inputs, one or more joysticks, one or more microphones, one or more cameras, one or more radar interfaces and/or one or more proximity sensors and so on.

In examples, the control system 12 provides means for controlling operation of the one or more user interfaces 46. Information may be transmitted between the control system 12 and the one or more user interfaces 46. For example, control information may be transmitted from the control system 12 to the one or more user interfaces 46 and/or information from the one or more user interfaces 46, such as destination data input via the one or more user interfaces 46, transmitted to the control system 12. This is illustrated in the example of FIG. 3 by the double-headed arrow linking the one or more user interfaces 46 and the control system 12.

The one or more transceivers 44 are for receiving and/or transmitting one or more signals. For example, the one or more transceivers 44 may be for receiving and/or transmitting one or more wireless signals. Any suitable transceiver or transceivers can be used and, in some examples, separate transmitter(s) and/or receiver(s) may be used.

The one or more transceivers 44 are for transmitting and/or receiving wireless signals over any suitable range. For example, the one or more transceivers 44 may be configured to receive and/or transmit electromagnetic signals over any suitable range.

In some examples, the one or more transceivers 44 are configured to receive and/or transmit electromagnetic signals using one or more shorter range protocols such as Bluetooth and/or wi-fi. Additional or alternatively, the one or more transceivers 44 may be configured to receive and/or transmit electromagnetic signals using one or more longer range protocols such as one or more cellular telephone protocols.

In examples, the one or more transceivers 44 are for transmitting and/or receiving wireless signal(s) comprising information. For example, the one or more transceivers 44 may be configured to transmit and/or receive wireless signal(s) comprising destination data and/or route information and/or location information of the vehicle 10, 16.

In examples, the one or more transceivers 44 are configured to receive one or more signals from a personal device of a user of the vehicle 10, such as a mobile phone, to allow the user of the vehicle to input information, such as destination data.

In examples, the one or more transceivers 44 may be considered to be at least part of the one or more user interfaces as the one or more transceivers 44 may be used to receive information, such as destination data, from/transmit information to a personal device of a user such as an occupant of the vehicle 10.

In examples, the control system 12 provides means for controlling operation of the one or more transceivers 44. Information may be transmitted between the control system 12 and the one or more transceivers 44. For example, control information may be transmitted from the control system 12 to the one or more transceivers 44 and/or data/information received in one or more wireless signals transmitted to the control system 12. This is illustrated in the example of FIG. 3 by the double-headed arrow linking the one or more transceivers 44 and the control system 12.

In examples, the control system 12 provides means for controlling the elements of the vehicle system 38. The control system 12 may be configured to control the elements of the vehicle system 38 using one or more wired or wireless network systems/protocols. For example, USB, HTMI, Bluetooth, wi-fi, CAN, LIN, i2c, FNET, FBD-link, UART, SBI and so on may be used.

In the example of FIG. 3, the vehicle system 38 is comprised in the vehicle 10, which is a hybrid electric vehicle 16.

The vehicle system 38 may comprise any number of additional elements not illustrated in the example of FIG. 3. Additionally or alternatively, one or more elements of the vehicle system 38 illustrated in the example of FIG. 3 may be integrated and/or combined. For example, the one or more transceivers 44 and the one or more user interfaces 46 may be at least partially combined.

In some examples, one or more of the elements illustrated in the example of FIG. 3 may be omitted from the vehicle system 38. For example, the one or more transceivers 44 may be omitted from the vehicle system 38.

Figure 4:
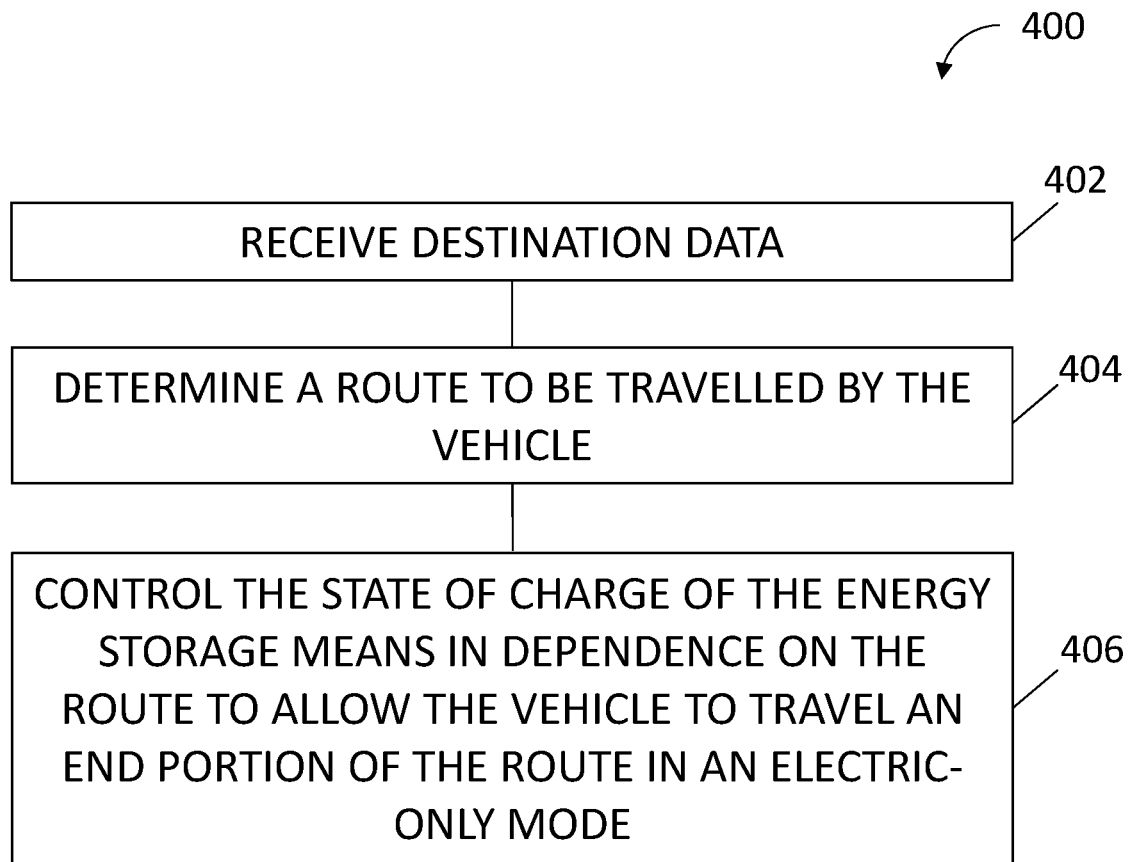
FIG. 4 illustrates an example of a method.

FIG. 4 illustrates an example of a method 400. The method 400 is for controlling a state of charge of energy storage means 14 of a hybrid electric vehicle 16. In examples, the vehicle 10, 16 can be a vehicle 10, 16 as illustrated in FIGS. 1 and/or 3.

In examples, the method 400 is performed by the control system 12 of FIG. 2A or 3 or the vehicle system 38 of FIG. 3. That is, in examples, the control system 12 described herein comprises means for performing the method 400. However, any suitable means may be used to perform the method 400.

At block 402 destination data is received. In examples, the destination data can be received in any suitable way. In some examples, the destination data is received from at least one input by a user of the vehicle 10, 16.

For example, the at least one input by a user of the vehicle 16 can be made using one or more user interfaces 46 as described in relation to FIG. 3.

In examples, the destination data provides information concerning a destination to which the vehicle 16 is to travel. That is, in examples, the destination data provides information as to the end point of a route that the vehicle 16 is to travel.

Any suitable destination data in any suitable form can be used. For example, any suitable destination data that allows for determination of a route to the desired destination can be used.

At block 404 a route 20 to be travelled by the vehicle 10, 16, the route 20 comprising one or more characteristics, is determined in dependence on the received destination data. Any suitable method for determining a route 20 to be travelled by the vehicle 10, 16 in dependence on the received destination data can be used.

As used herein, determining a route 20 is intended to include processing information such as the destination data, current location of the vehicle 10, 16 and map information to determine the route 20 and also to include receiving the route 20 to be travelled by the vehicle.

In some examples, a user of the vehicle 10, 16 can confirm the route to be travelled by making one or more inputs via the one or more user interfaces 46 of FIG. 3.

In examples, the characteristics of the route 20 can comprise any suitable characteristic or characteristics of the route 20 that can be used by the control system 12 to control the state of charge of the energy storage means 14 of the vehicle 10, 16 to allow the vehicle 10, 16 to travel an end portion 22 of the route 20 in an electric only mode.

In some examples, the one or more characteristics of the route comprises at least one of: a length of route, an expected speed profile, a gradient profile, an expected traffic flow profile and availability of a vehicle charger at the end of the route.

In examples, the length of the route can be considered to be the total distance to be travelled by the vehicle 10, 16 along the route 20.

In examples, the expected speed profile can be considered to be the profile of the expected speed of the vehicle 10, 16 along the route 20. The expected speed profile can be influenced by a number of factors.

For example, the expected speed profile can be influenced by on one or more of: speed limits along the route 20, average speeds along the route 20, traffic information along the route 20 and so on. The expected traffic flow profile may be based on the expected speed profile and be further refined using predictive and/or historical traffic information based on the day of the week and time of day that the journey started and is predicted to end. The expected traffic flow profile may be calculated with the vehicle 10, 16 and/or may be calculated remotely and provided as a cloud-based service accessible to the vehicle 10, 16 and/or a portable electronic device such as a mobile phone carried by a user of the vehicle 10, 16.

In some examples, the expected speed profile can be influenced by and/or dependent on the expected traffic flow profile. The expected speed profile can represent the expected speed variation of the vehicle 16 along the route 20. In examples the expected speed profile can be determined for different segments of the route 20.

In examples, the gradient profile can be considered to be a profile of the gradient or gradients that the vehicle 10, 16 will encounter as the vehicle 10, 16 travels along the route 20 to the destination. Such information can, for example, allow determination of sections of the route 20 where energy can be regenerated by the vehicle 10, 16.

In examples, a vehicle charger can be considered to be a charger configured to charge the energy storage means 14 of the vehicle 16.

At block 406 the state of charge of the energy storage means 14 is controlled in dependence on the route 20 to allow the vehicle 10, 16 to travel an end portion 22 of the route 20 in an electric-only mode. For example, the end portion 22 of the route 20 can, in examples, be the end 1.5 km of the route 20.

Any suitable method for controlling the state of charge of the energy storage means 14 in dependence on the route 20 to allow the vehicle 10, 16 to travel an end portion 22 of the route 20 in an electric-only mode can be used.

In examples, the amount of energy required to travel the end portion 22 of the route 20 in an electric-only mode can be determined or estimated and the state of charge of the energy storage means 14 controlled as the vehicle 10, 16 travels along the route 20 to ensure that sufficient charge is present in the energy storage means 14 to allow the vehicle 10, 16 to travel the end portion 22 of the route 20 in an electric-only mode.

In examples, controlling the state of charge of the energy storage means 14 comprises determining energy harvesting opportunities via regeneration to allow electric-only mode at the end portion 22 of the route 20.

In examples, controlling the state of charge of the energy storage means comprises controlling: an electrical energy usage of the vehicle 16; an electrical energy storage of the vehicle 16; and/or an electrical energy generation of the vehicle 16.

For example, controlling the state of charge of the energy storage means 14 can comprise controlling use of electric motor(s) of the vehicle 16; controlling use of energy regeneration system(s) of the vehicle 16 and/or controlling state of charge thresholds of energy storage means 14 of the vehicle 16.

In examples, controlling the electrical energy storage of the vehicle 16 comprises allowing the state of charge of the energy storage means 14 of the vehicle 16 to fall below a charge sustain threshold of the vehicle 16 to allow the vehicle 16 to travel the end portion 22 of the route 20 in electric only mode.

In examples a charge sustain threshold can be considered a threshold around which the state of charge of the energy storage means will be held. In examples the state of charge of the energy storage means 14 may temporally fall below the charge sustain threshold due to transient energy demands. However, the vehicle 10, 16 will try to recharge the energy storage means 14 to maintain the state of charge of the energy storage means 14 at or above the charge sustain threshold.

In some examples, controlling electrical energy storage of the vehicle 16 comprises allowing the state of the charge of the energy storage means 14 over the vehicle 16 to fall below a charge sustain threshold in the end portion 22 of the route 20 to allow the vehicle 16 to travel the end portion 22 of the route 20 in electric only mode.

In some examples, controlling electrical energy storage of the vehicle 16 comprises allowing the state of charge of the energy storage means 14 of the vehicle 16 to fall below a charge sustain threshold in dependence on the availability of at least one vehicle charger at the end of the route 20.

In examples, the vehicle 16 comprises energy management modes that can be used to control a state of charge of the energy storage means 14 of the vehicle 16.

Accordingly, in examples, controlling the state of charge of the energy storage means 14 comprises selecting an energy management mode for at least a portion of the route 20. In some examples an energy management mode can be selected for the whole route 20. In examples, the energy management mode is a charging mode or a harvesting mode.

In a charging mode the energy storage means 14 of the vehicle 16 is charged with an engine of the vehicle 16.

In harvesting mode energy is stored by inhibiting use of one or more electric motors of the vehicle 16 for providing positive torque. For example, in harvest mode torque assist, in which torque from an electric motor can replace part of the torque from an internal combustion engine, can be inhibited. In harvesting mode the one or more electric motors can be used to convert kinetic energy of the vehicle into electrical energy which can be used to recharge the energy storage means 14.

Therefore, in examples, charging mode comprises controlling an engine of the vehicle 16 to provide torque to allow electrical energy generation. In examples, the amount of torque provided by the engine of the vehicle 16 can be controlled to control the amount of electrical energy generation.

That is, generation of energy can be given a greater or reduced priority in dependence on the route 20 to ensure that sufficient energy is present to allow the end portion 22 of the route 20 to be travelled in an electric-only mode.

In some examples, the method 400 comprises segmenting the route 20 into a plurality of segments 32 in dependence on the one or more characteristics of the route; and assigning an energy management mode to one or more of the plurality of segments 32. See, for example, FIGS. 5 and 6.

In examples, the route 20 can be segmented into a plurality of segments 32 in any suitable way using any suitable method.

In examples, the route 20 can be segmented into a plurality of segments 32 in dependence on the length of the route 20, the expected speed profile along the route 20, the expected gradient profile along the route 20, the expected traffic flow profile of the route and/or the availability of a vehicle charger at the end of the route 20.

In examples, the method 400 can be adaptive. That is, if the route 20 changes the control system 12 can adapt control of the state of charge of the energy storage means 14 in dependence on the change to ensure that an end portion 22 of the route 20 can be travelled in an electric-only mode.

For example, the expected speed profile and/or traffic profile of the route 20 may change due to, for example, changes in traffic along the route 20 and the control of the state of charge of the energy storage means 14 may be changed in dependence on the change, by, for example, changing the amount of energy to be harvested and/or obtained through charging by an engine.

In examples, segmentation of the route 20 may dynamically change in dependence on dynamically changing characteristics of the route 20.

A technical effect of the method 400 is a reduction in noise and/or air pollution at the end portions of routes 20 which are typically built-up and populace.

In some examples a speed threshold for electric only mode is used to ensure that the vehicle 16 can travel the end portion 22 of the route 20 in electric only mode. In such examples, the route 20 is segmented into a plurality of segments 32, each segment having an associated speed, length and gradient. The last segment can be considered the end portion 22 of the route 20.

The route 20 can be split into speed bands, for example, 0 to 5 kph, 5 to 10 kph, 10 to 15 kph and so on, up to a maximum band, for example 145 to 150 kph. However, in examples, any suitable speed bands can be used.

The energy demand for each segment 32 of the route 20 can be determined or estimated using the following equation:

$$E_{segment}[J] =$$

$$\left(C_1 + C_2 \cdot V_{segment} + C_3 \cdot V_{segment}^2 + m \cdot g \cdot \frac{S_{segment}[\%]}{100}\right) \cdot L_{segment}[m]$$

Where: $C_1$, $C_2$ and $C_3$ are road load coefficients, $E_{segment}$ is the energy required for each segment, $V_{segment}$ is the speed of each segment, m is the mass of the vehicle, g is acceleration due to gravity, $S_{segment}$ is the gradient of each segment and $L_{segment}$ is the length of each segment.

The road load coefficients take into account factors such as vehicle mass, aerodynamic drag, road drag and so on. The road load coefficients can be determined in any suitable way. For example, the road load coefficients can be determined using theory, using one or more models, using one or more experiments and/or using one or more simulations and so on.

The energy demand for the last segment 32, or end portion 22, of the route 20 can be determined using the above formula. This can be considered $E_{arrival}[J]$.

The total energy stored in the energy storage means 14 can be obtained ($E_{total}[J]$) and the energy available for the segments 32 excluding the final segment 32 calculated via:

$$E_{available}[J] = E_{total}[J] - E_{arrival}[J]$$

All the energies, for the segments 32 other than the final segment, in a speed band, can be summed up, starting with the lowest band, until the summed value reaches $E_{available}$.

The speed threshold for electric only mode on the route 20 is the average speed of the last or highest speed band which can be covered by $E_{available}$. Thus a speed threshold for electric only mode for the route 20 can be determined to ensure that the end portion 22 of the route 20 can be travelled in electric only mode.

Figure 5:
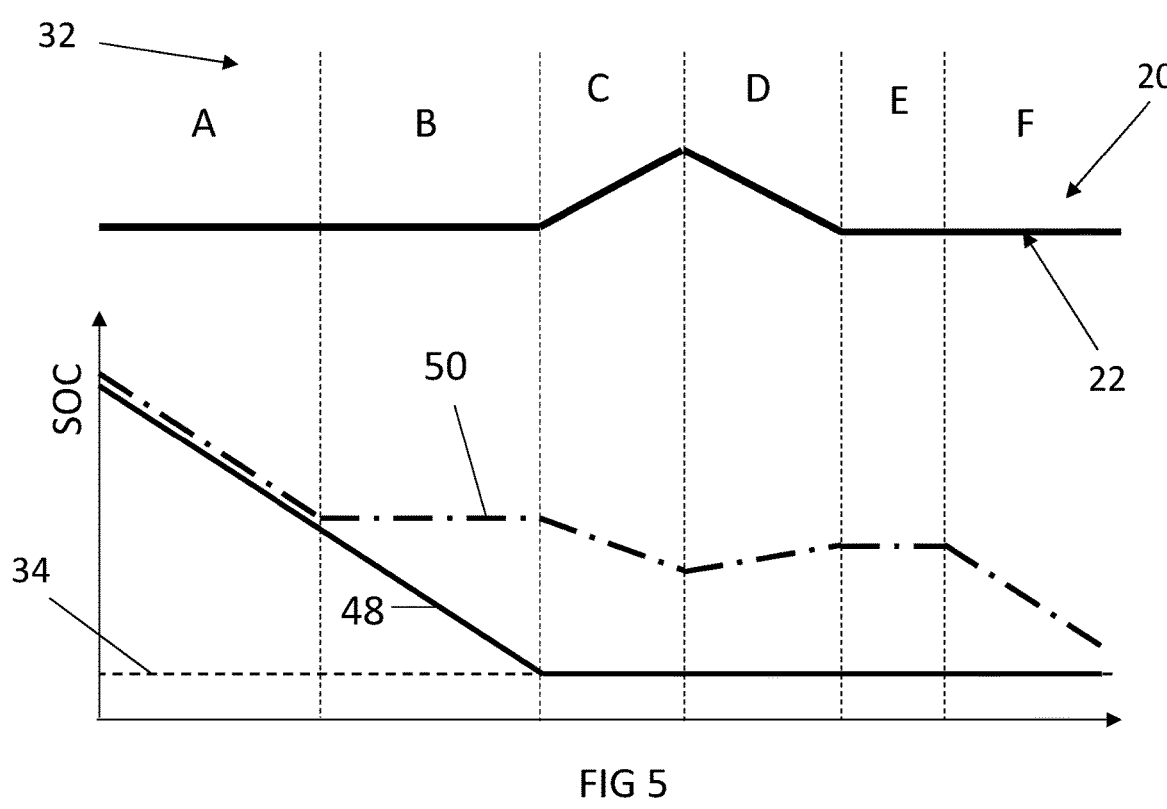
FIG. 5 illustrates an example scenario.

FIG. 5 illustrates an example of controlling a state of charge of energy storage means 14 of a hybrid electric vehicle 16.

The upper section of FIG. 5 schematically illustrates a route 20 with the end portion 22 of the route 20 being to the right of the figure. The example of FIG. 5 is not shown to scale. The gradient profile of the route is schematically illustrated.

The lower portion of FIG. 5 illustrates a plot of state of charge of energy storage means 14 of the vehicle 16 on the y axis and route distance along the x axis. The solid line 48 on the plot illustrates the state of charge of the energy storage means 14 without control of the energy storage means 14 to allow the vehicle to travel the end portion 22 of the route 20 in an electric-only mode. The dot dashed line 50 illustrates the state of charge of the energy storage means 14 with the control described herein. The dashed line 34 in the plot of FIG. 5 illustrates the charge sustain threshold for the vehicle 16.

In the example of FIG. 5, the route 20 has been segmented into six different portions or segments 32 labelled A to F in dependence on characteristics of the route 20. The end portion 22 of the route 20 is portion F and is, in this example, the final 1.5 km of the route 20.

In the example of FIG. 5 the route 20 has been segmented in dependence on the gradient profile and expected speed profile of the route 20. Furthermore, no vehicle charger is available at the end of the route 20 in the example of FIG. 5.

The segments A and B have been separated as, in the example, segment A has a lower speed limit than segment B.

In the example of FIG. 5, segment C has been determined in dependence, at least, on the uphill gradient and segment D at least on the downhill gradient.

Sections E and F have been segmented to create a section for the end portion 22 of the route 20.

First considering the solid line 48 of the plot of FIG. 5 without control of the state of charge of the energy storage means 14 as described herein.

As can be seen by the solid line 48, at the start of the journey the state of charge of the energy storage means 14 is high and the vehicle proceeds in electric-only mode depleting the state of charge of the energy storage means 14. Without the control of the state of charge, the state of charge of the energy storage means 14 continues to deplete until the charge sustain threshold 34 is hit at which point the state of charge of the vehicle 16 is maintained at the charge sustain threshold 34. In this scenario, with the vehicle in a charge sustain condition, the traction motor will not be used to provide electric-only propulsion until the battery state of charge is above the charge sustain threshold 34.

It is therefore evident that without the control of the state of charge of the energy storage means 14 along the route 20 of FIG. 5 the last portion 22, F of the route 20 could not be travelled in electric-only mode.

Now considering the dot dashed line 50 illustrating the state of charge of the energy storage means 14 when controlled as described herein.

In section A the vehicle 16 also travels in electric-only mode depleting the state of charge of the energy storage means 14. However, in section B the state of charge of the energy storage means 14 is held. In the example, this is done through use of an engine of the vehicle 16.

In section C the vehicle must travel up an incline and some energy from the energy storage means 14 is used to assist in doing so reducing the state of charge.

However, in section D the vehicle 16 travels down an incline allowing energy regeneration to increase the state of charge of the vehicle 16. In section D the vehicle 6 is put into a harvesting mode.

In section E the state of charge of the vehicle is again held which ensures that there is sufficient state of charge in the energy storage means 14 of the vehicle 16 to allow the vehicle 16 to travel the end portion 22 (section F) of the route 20 in electric only mode.

Accordingly, it can be seen in the example of FIG. 5 that controlling the state of charge of the energy storage means 14 in dependence on the route allows electric only mode in the end portion 22 reducing air and noise pollution in the end portion 22. Furthermore, doing so can improve the perception of the electric only mode of the vehicle.

In the example of FIG. 5, the amount of energy needed to travel the end portion 22 of the route 20 in electric-only mode is determined and the control of the state of charge along the route 20 planned to provide sufficient energy in the end portion 22. For example, it is determined to hold the state of charge in section B and to put the vehicle 16 into harvest mode in section D.

Figure 6:
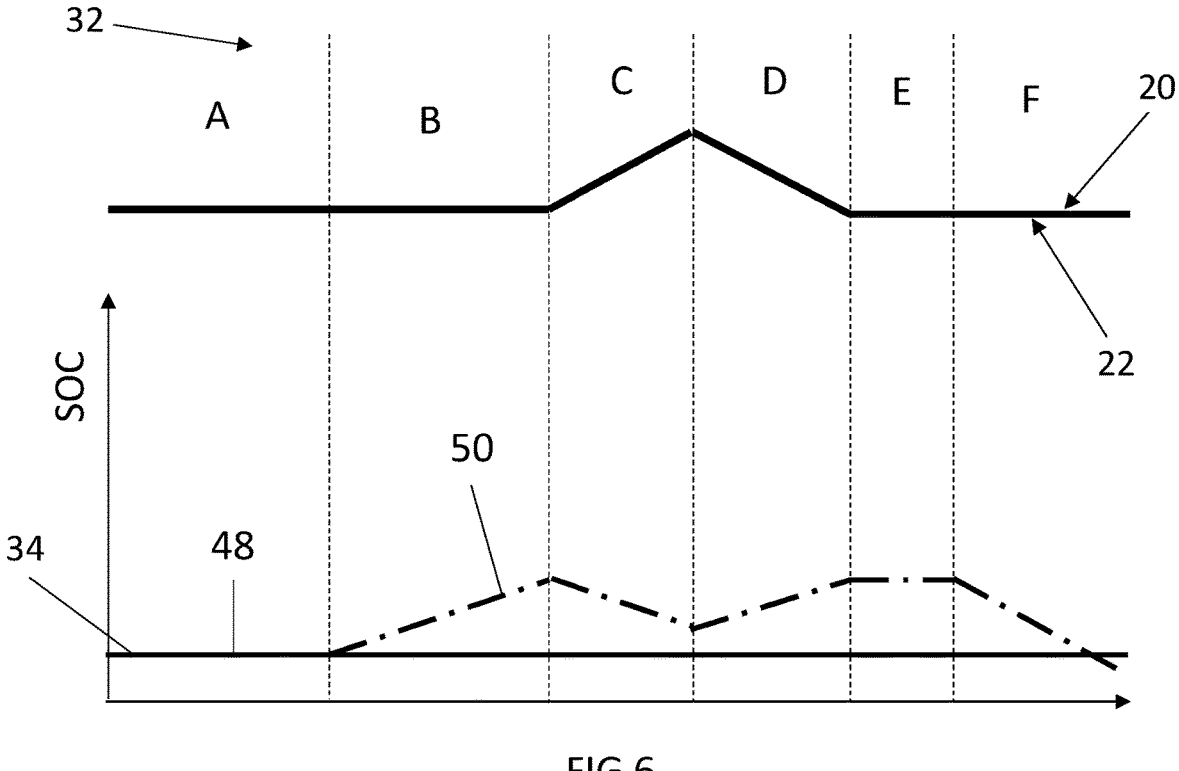
FIG. 6 illustrates an example scenario.

FIG. 6 illustrates an example of controlling a state of charge of energy storage means 14 of a hybrid electric vehicle 16.

In the example of FIG. 6, the same route and route segmentation is shown in the schematic illustration and plot of state of charge versus distance along the route 20.

However, in the example of FIG. 6, the state of charge of the energy storage means 14 starts at the charge sustain threshold 34.

In FIG. 6 the state of charge, without the control described herein, is again shown by the solid line 48.

In the example of FIG. 6, as the state of charge of the energy storage means 14 begins at the charge sustain threshold 34 it is maintained at this threshold 34 throughout the journey.

In FIG. 6 the state of charge of the energy storage means 14, with the control described herein, is again illustrated by the dot dashed line 50.

Over the first section, A, the state of charge also remains at the charge sustain threshold 34.

However, in section B, in the case of using the control described herein, the vehicle 16 is put into a charging mode and an engine of the vehicle is controlled to provide torque to allow charging of the energy storage means 14. Accordingly, the state of charge of the energy storage means in section B increases as illustrated by the dot dashed line 50.

In other examples where there are more regenerative opportunities along a route harvest mode could be used instead of charging mode.

In section C of FIG. 6, similarly to section C of FIG. 5, the vehicle 16 must travel up an incline and therefore some energy is used in doing so and the state of charge of the energy storage means 14 decreases accordingly.

At section D, in FIG. 6, similarly to FIG. 5, the vehicle harvests energy via regeneration as the vehicle 16 travels down an incline and the state of charge is, again, held in section E.

The vehicle 16 is again, similarly to FIG. 5, put into a harvest mode in section D.

This, again, provides sufficient state of charge for the vehicle 16 to traverse the end portion 22 of the route 20 (section F) in electric-only mode.

In the example of FIG. 6, the state of charge of the energy storage means 14 is less at the beginning of section F compared to the state of charge in FIG. 5.

However, in the example of FIG. 6, a charger is present at the destination and therefore the state of charge of the energy storage means 14 is allowed to fall below the charge sustain threshold 34 of the vehicle 16 to allow the vehicle 16 to travel the end portion 22 of the route 20 in electric only mode.

If, for example, no charger were present at the destination in the example of FIG. 6 the generation of energy could be more actively prioritised in portion B to ensure that the end portion 22 of the route 20 could be travelled in electric only mode without falling below the charge sustain threshold of the vehicle.

In the example of FIG. 6, the amount of energy needed to travel the end portion 22 of the route 20 in electric-only mode is determined and the control of the state of charge along the route 20 planned to provide sufficient energy in the end portion 22. For example, it is determined to put the vehicle into charging mode in section B and to put the vehicle 16 into harvest mode in section D.

However, in the example of FIG. 6, it is determined that less energy is required to drive the end portion 22 in electric-only mode as a vehicle charger is present at the end of the route 20 and the state of charge is therefore allowed to fall below the charge sustain threshold in the end portion 22.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the FIG. 4 may represent steps in a method and/or sections of code in the computer program 30. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling a state of charge of energy storage means of a hybrid electric vehicle, the control system comprising one or more electronic controllers, the one or more electronic controllers configured to:

receive destination data;

determine a route to be travelled by the vehicle, the route comprising one or more characteristics, in dependence on the received destination data;

control the hybrid electric vehicle to maintain a charge sustain threshold, wherein the charge sustain threshold is a value at which the energy storage means is not permitted to fall below; and control the state of charge of the energy storage means in dependence on the route to allow the vehicle to travel an end portion of the route in an electric-only mode;

wherein controlling the state of charge of the energy storage means comprises controlling an electrical energy storage of the vehicle;

wherein controlling the electrical energy storage of the vehicle comprises allowing the state of charge of the energy storage means of the vehicle to fall below the charge sustain threshold of the vehicle to allow the vehicle to travel the end portion of the route in electric-only mode; and wherein controlling electrical energy storage of the vehicle comprises allowing the state of charge of the energy storage means of the vehicle to fall below the charge sustain threshold in dependence on the availability of at least one vehicle charger at the end of the route.

2. A control system as claimed in claim 1, wherein the one or more controllers collectively comprise:

at least one electronic processor having an electrical input for receiving destination data and information associated with determining a route to be travelled by the vehicle; and at least one electronic memory device electrically coupled to the at least one electronic processor and having instructions stored therein;

and wherein the at least one electronic processor is configured to access the at least one electronic memory device and execute the instructions thereon so as to cause the control system to determine a route to be travelled by the vehicle and to control the state of charge of the energy storage means.

3. A control system as claimed in claim 1, wherein the one or more characteristics of the route comprises at least one of:

a length of route;

an expected speed profile;

a gradient profile;

an expected traffic flow profile; and availability of a vehicle charger at the end of the route.

4. A control system as claimed in claim 1, wherein the destination data is received from at least one input by a user of the vehicle.

5. A control system as claimed in claim 1, wherein controlling the state of charge of the energy storage means comprises selecting an energy management mode for at least a portion of the route.

6. A control system as claimed in claim 5, wherein the energy management mode is a charging mode or a harvesting mode, in which energy is stored by inhibiting use of one or more electric motors of the vehicle for providing positive torque.

7. A control system as claimed in claim 6, wherein the charging mode comprises controlling an engine of the vehicle to provide torque to allow electrical energy generation.

8. A control system as claimed in claim 1, wherein the one or more electronic controllers are configured to:

segment the route into a plurality of segments in dependence on the one or more characteristics of the route; and assign an energy management mode to one or more of the plurality of segments.

9. A control system as claimed in claim 1, wherein controlling the state of charge of the energy storage means comprises controlling:

an electrical energy usage of the vehicle;
and/or
an electrical energy generation of the vehicle.

10. A vehicle system comprising a control system as claimed in claim 1 and one or more components of a hybrid electric vehicle powertrain.

11. A vehicle comprising a control system as claimed in claim 1.

12. A method for controlling a state of charge of energy storage means of a hybrid electric vehicle, the method comprising:

receiving destination data;
determining a route to be travelled by the vehicle, the route comprising one or more characteristics, in dependence on the received destination data;
controlling the hybrid electric vehicle to maintain a charge sustain threshold, wherein the charge sustain threshold is a value at which the energy storage means is not permitted to fall below; and controlling the state of charge of the energy storage means in dependence on the route to allow the vehicle to travel an end portion of the route in an electric only mode;

wherein controlling the state of charge of the energy storage means comprises controlling an electrical energy storage of the vehicle;

wherein controlling the electrical energy storage of the vehicle comprises allowing the state of charge of the energy storage means of the vehicle to fall below the charge sustain threshold of the vehicle to allow the vehicle to travel the end portion of the route in electric-only mode; and wherein controlling electrical energy storage of the vehicle comprises allowing the state of charge of the energy storage means of the vehicle to fall below the charge sustain threshold in dependence on the availability of at least one vehicle charger at the end of the route.

13. A non-transitory computer readable medium comprising computer readable instructions that, when executed by a processor, perform the method of claim 12.

14. A vehicle comprising a vehicle system as claimed in claim 10.

* * * * *